United States Patent
Diwinsky et al.

(10) Patent No.: US 10,024,163 B2
(45) Date of Patent: Jul. 17, 2018

(54) IN SITU TIP REPAIR OF AN AIRFOIL TIP IN A GAS TURBINE ENGINE VIA FRICTIONAL WELDING

(71) Applicant: General Electric Company, Schenectady, NY (US)

(72) Inventors: David Scott Diwinsky, West Chester, OH (US); Herbert Chidsey Roberts, Middletown, OH (US)

(73) Assignee: General Electric Company, Schenectady, NY (US)

( * ) Notice: Subject to any disclaimer, the term of this patent is extended or adjusted under 35 U.S.C. 154(b) by 228 days.

(21) Appl. No.: 15/057,254

(22) Filed: Mar. 1, 2016

(65) Prior Publication Data

US 2017/0254205 A1 Sep. 7, 2017

(51) Int. Cl.
*F01D 5/00* (2006.01)
*B23K 20/12* (2006.01)
*F01D 5/30* (2006.01)

(52) U.S. Cl.
CPC .......... *F01D 5/005* (2013.01); *B23K 20/1215* (2013.01); *F01D 5/30* (2013.01); *F05D 2220/32* (2013.01); *F05D 2230/80* (2013.01)

(58) Field of Classification Search
CPC . F01D 5/005; F01D 5/20; F01D 5/288; F01D 11/08–11/24; F01D 5/16;

(Continued)

(56) References Cited

U.S. PATENT DOCUMENTS 2,366,164 A 1/1945 Weick et al.
5,344,284 A * 9/1994 Delvaux ................. F01D 11/22
                                                    415/173.2

(Continued)

FOREIGN PATENT DOCUMENTS

EP   2 338 637 A2   6/2011
EP   2 594 738 A1   5/2013
EP   2 979 815 A1   2/2016

OTHER PUBLICATIONS

Diwinsky, et al., In Situ gas turbine prevention of crack growth progression via laser welding, GE co-pending U.S. Appl. No. 15/014,095, filed Feb. 3, 2016

(Continued)

*Primary Examiner* — Jun Yoo
(74) *Attorney, Agent, or Firm* — General Electric Company; Pamela Kachur (57) ABSTRACT

Methods for material build-up on a tip of a blade of a gas turbine engine are provided. The method can include inserting a material supply and an inflatable bladder between the tip and a shroud such that the material supply is exposed to the tip and the inflatable bladder is positioned between the material supply and a shroud, inflating the inflatable bladder to force contact between the material supply and the tip, and causing relative movement between the material supply and the tip. The relative movement, in combination with the radial biased contact between the material supply and the tip, creates heat through friction. As such, the relative movement can frictionally weld new material from the material supply onto the tip of the blade. For example, the heat created can be sufficient to melt the surface of the material supply to transfer material from the material supply to the tip.

20 Claims, 5 Drawing Sheets

(58) Field of Classification Search
CPC .... B23P 6/007; B23P 6/002; B23K 2201/001; B23K 20/002; B23K 20/10; B23K 20/12; B23K 20/1205; B23K 20/129; Y10T 29/49318; Y10T 29/49325; Y10T 29/49336; Y10T 29/49732; Y10T 29/49742; F05D 2230/80; F05D 2230/23; F05D 2220/32; F05D 2240/307; B33Y 10/00; B33Y 30/00; B33Y 80/00; Y02P 10/29

See application file for complete search history.

(56) References Cited

U.S. PATENT DOCUMENTS

| | | | |
|---|---|---|---|
| 5,551,840 A * | 9/1996 | Benoit | F01D 11/12 416/241 B |
| 6,206,067 B1 | 3/2001 | Kociemba et al. | |
| 6,270,603 B1 | 8/2001 | Westerman et al. | |
| 6,542,230 B1 | 4/2003 | Luke | |
| 6,640,437 B2 | 11/2003 | McFarland | |
| 6,671,938 B2 | 1/2004 | McFarland | |
| 7,032,279 B2 | 4/2006 | McCarvill et al. | |
| 7,278,208 B2 | 10/2007 | LeSaint et al. | |
| 7,810,696 B2 | 10/2010 | Nunnery | |
| 8,801,502 B2 | 8/2014 | Ng et al. | |
| 8,927,897 B2 | 1/2015 | Xu et al. | |
| 8,991,047 B2 | 3/2015 | Anasis et al. | |
| 2006/0042083 A1 | 3/2006 | Baker et al. | |
| 2015/0034266 A1 | 2/2015 | Bruck et al. | |
| 2015/0174838 A1 | 6/2015 | Kittleson et al. | |
| 2016/0032743 A1 | 2/2016 | Duchaine | |

OTHER PUBLICATIONS

Extended European Search Report and Opinion issued in connection with corresponding EP Application No. 17158351.1 dated Jun. 30, 2017.

* cited by examiner

IN SITU TIP REPAIR OF AN AIRFOIL TIP IN A GAS TURBINE ENGINE VIA FRICTIONAL WELDING

FIELD OF THE INVENTION

The present subject matter relates generally to gas turbine engines and, more particularly, to a system and method for performing an in situ repair of an internal component of a gas turbine engine.

BACKGROUND OF THE INVENTION

A gas turbine engine typically includes a turbomachinery core having a high pressure compressor, combustor, and high pressure turbine in serial flow relationship. The core is operable in a known manner to generate a primary gas flow. The high pressure compressor includes annular arrays ("rows") of stationary vanes that direct air entering the engine into downstream, rotating blades of the compressor. Collectively one row of compressor vanes and one row of compressor blades make up a "stage" of the compressor. Similarly, the high pressure turbine includes annular rows of stationary nozzle vanes that direct the gases exiting the combustor into downstream, rotating blades of the turbine. Collectively one row of nozzle vanes and one row of turbine blades make up a "stage" of the turbine. Typically, both the compressor and turbine include a plurality of successive stages.

Gas turbine engines, particularly aircraft engines, require a high degree of periodic maintenance. For example, periodic maintenance is often scheduled to allow internal components of the engine to be inspected for defects and subsequently repaired. Unfortunately, many conventional repair methods used for aircraft engines require that the engine be removed from the body of the aircraft and subsequently partially or fully disassembled. As such, these repair methods result in a significant increase in both the time and the costs associated with repairing internal engine components.

Accordingly, a system and method for performing an in situ repair of an internal component of a gas turbine engine would be welcomed within the technology.

BRIEF DESCRIPTION OF THE INVENTION

Aspects and advantages of the invention will be set forth in part in the following description, or may be obvious from the description, or may be learned through practice of the invention.

Methods are generally provided for material build-up on a tip of a blade of a gas turbine engine. In one embodiment, the method includes inserting a material supply and an inflatable bladder between the tip and a shroud such that the material supply is exposed to the tip and the inflatable bladder is positioned between the material supply and a shroud, inflating the inflatable bladder to force contact between the material supply and the tip, and causing relative movement between the material supply and the tip. The relative movement, in combination with the radial biased contact between the material supply and the tip, creates heat through friction. As such, the relative movement can frictionally weld new material from the material supply onto the tip of the blade. For example, the heat created can be sufficient to melt the surface of the material supply to transfer material from the material supply to the tip.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended Figs., in which.

Repeat use of reference characters in the present specification and drawings is intended to represent the same or analogous features or elements of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

In general, a system and method is provided for performing an in situ repair of an internal component of a gas turbine engine. In one embodiment, a material supply of a solid material can be positioned against and put into contact with a surface of a component, and then heated to transfer the material from the material supply to the surface of the component. The material supply may be in the form of a wire, a sheet, a block, or another solid material. In certain embodiments, the surface of the component may be heated through frictional movement between the material supply and the component. In other embodiments, thermal energy may be supplied to the interface between the material supply and the component, such as through a heater, a laser, etc.

As stated, the material supply can be pressed against the surface of the component such that relative movement therebetween creates heat (through friction). In several embodiments, an inflatable bladder can be utilized to press the material supply against the surface of the component. Alternatively or additionally, a repair tool can be inserted through an access port of the gas turbine engine to temporarily attach to the material supply to the surface of the component, allowing pressed contact therebetween. Additionally, the repair tool can supply an energy source towards the interface (e.g., a laser to heat to fuse new material). For example, if the new material is supplied as a solid, then the laser can heat and weld the material within the crack to repair the defect.

It should be appreciated that the disclosed systems and methods may generally be used to perform in situ repairs of internal components located within any suitable type of engine, including aircraft-based turbine engines and land-based turbine engines, regardless of the engine's current assembly state (e.g., fully or partially assembled). Additionally, with reference to aircraft engines, it should be appreciated that the present subject matter may be implemented on-wing or off-wing.

Figure 1:
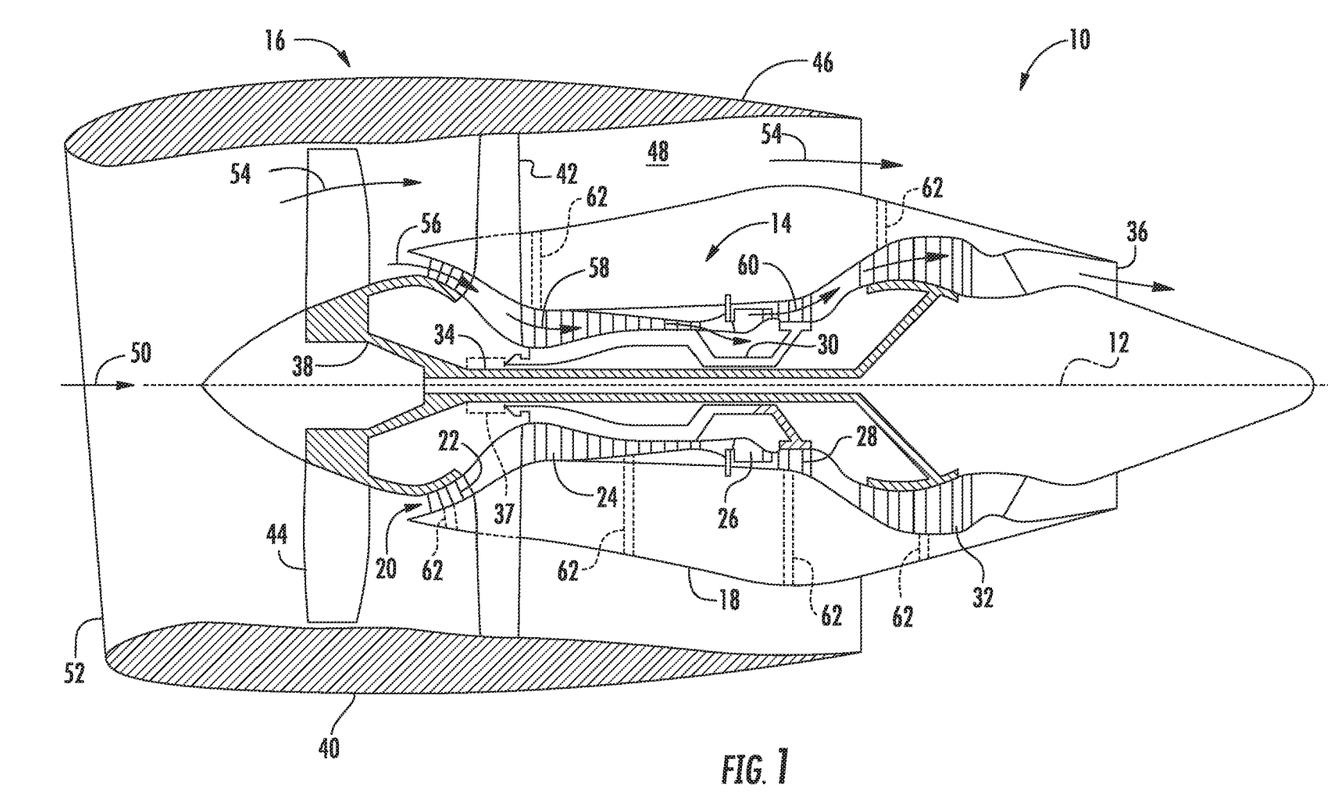
FIG. 1 illustrates a cross-sectional view of one embodiment of a gas turbine engine that may be utilized within an aircraft in accordance with aspects of the present subject matter.

Referring now to the drawings, FIG. 1 illustrates a cross-sectional view of one embodiment of a gas turbine engine 10 that may be utilized within an aircraft in accordance with aspects of the present subject matter, with the engine 10 being shown having a longitudinal or axial centerline axis 12 extending therethrough for reference purposes. In general, the engine 10 may include a core gas turbine engine (indicated generally by reference character 14) and a fan section 16 positioned upstream thereof. The core engine 14 may generally include a substantially tubular outer casing 18 that defines an annular inlet 20. In addition, the outer casing 18 may further enclose and support a booster compressor 22 for increasing the pressure of the air that enters the core engine 14 to a first pressure level. A high pressure, multi-stage, axial-flow compressor 24 may then receive the pressurized air from the booster compressor 22 and further increase the pressure of such air. The pressurized air exiting the high-pressure compressor 24 may then flow to a combustor 26 within which fuel is injected into the flow of pressurized air, with the resulting mixture being combusted within the combustor 26. The high energy combustion products are directed from the combustor 26 along the hot gas path of the engine 10 to a first (high pressure) turbine 28 for driving the high pressure compressor 24 via a first (high pressure) drive shaft 30, and then to a second (low pressure) turbine 32 for driving the booster compressor 22 and fan section 16 via a second (low pressure) drive shaft 34 that is generally coaxial with first drive shaft 30. After driving each of turbines 28 and 32, the combustion products may be expelled from the core engine 14 via an exhaust nozzle 36 to provide propulsive jet thrust.

Additionally, as shown in FIG. 1, the fan section 16 of the engine 10 may generally include a rotatable, axial-flow fan rotor assembly 38 that is configured to be surrounded by an annular fan casing 40. It should be appreciated by those of ordinary skill in the art that the fan casing 40 may be configured to be supported relative to the core engine 14 by a plurality of substantially radially-extending, circumferentially-spaced outlet guide vanes 42. As such, the fan casing 40 may enclose the fan rotor assembly 38 and its corresponding fan rotor blades 44. Moreover, a downstream section 46 of the fan casing 40 may extend over an outer portion of the core engine 14 so as to define a secondary, or by-pass, airflow conduit 48 that provides additional propulsive jet thrust.

It should be appreciated that, in several embodiments, the second (low pressure) drive shaft 34 may be directly coupled to the fan rotor assembly 38 to provide a direct-drive configuration. Alternatively, the second drive shaft 34 may be coupled to the fan rotor assembly 38 via a speed reduction device 37 (e.g., a reduction gear or gearbox) to provide an indirect-drive or geared drive configuration. Such a speed reduction device(s) may also be provided between any other suitable shafts and/or spools within the engine 10 as desired or required.

During operation of the engine 10, it should be appreciated that an initial air flow (indicated by arrow 50) may enter the engine 10 through an associated inlet 52 of the fan casing 40. The air flow 50 then passes through the fan blades 44 and splits into a first compressed air flow (indicated by arrow 54) that moves through conduit 48 and a second compressed air flow (indicated by arrow 56) which enters the booster compressor 22. The pressure of the second compressed air flow 56 is then increased and enters the high pressure compressor 24 (as indicated by arrow 58). After mixing with fuel and being combusted within the combustor 26, the combustion products 60 exit the combustor 26 and flow through the first turbine 28. Thereafter, the combustion products 60 flow through the second turbine 32 and exit the exhaust nozzle 36 to provide thrust for the engine 10.

The gas turbine engine 10 may also include a plurality of access ports defined through its casings and/or frames for providing access to the interior of the core engine 14. For instance, as shown in FIG. 1, the engine 10 may include a plurality of access ports 62 (only six of which are shown) defined through the outer casing 18 for providing internal access to one or both of the compressors 22, 24 and/or for providing internal access to one or both of the turbines 28, 32. In several embodiments, the access ports 62 may be spaced apart axially along the core engine 14. For instance, the access ports 62 may be spaced apart axially along each compressor 22, 24 and/or each turbine 28, 32 such that at least one access port 62 is located at each compressor stage and/or each turbine stage for providing access to the internal components located at such stage(s). In addition, the access ports 62 may also be spaced apart circumferentially around the core engine 14. For instance, a plurality of access ports 62 may be spaced apart circumferentially around each compressor stage and/or turbine stage.

It should be appreciated that, although the access ports 62 are generally described herein with reference to providing internal access to one or both of the compressors 22, 24 and/or for providing internal access to one or both of the turbines 28, 32, the gas turbine engine 10 may include access ports 62 providing access to any suitable internal location of the engine 10, such as by including access ports 62 that provide access within the combustor 26 and/or any other suitable component of the engine 10.

Figure 2:
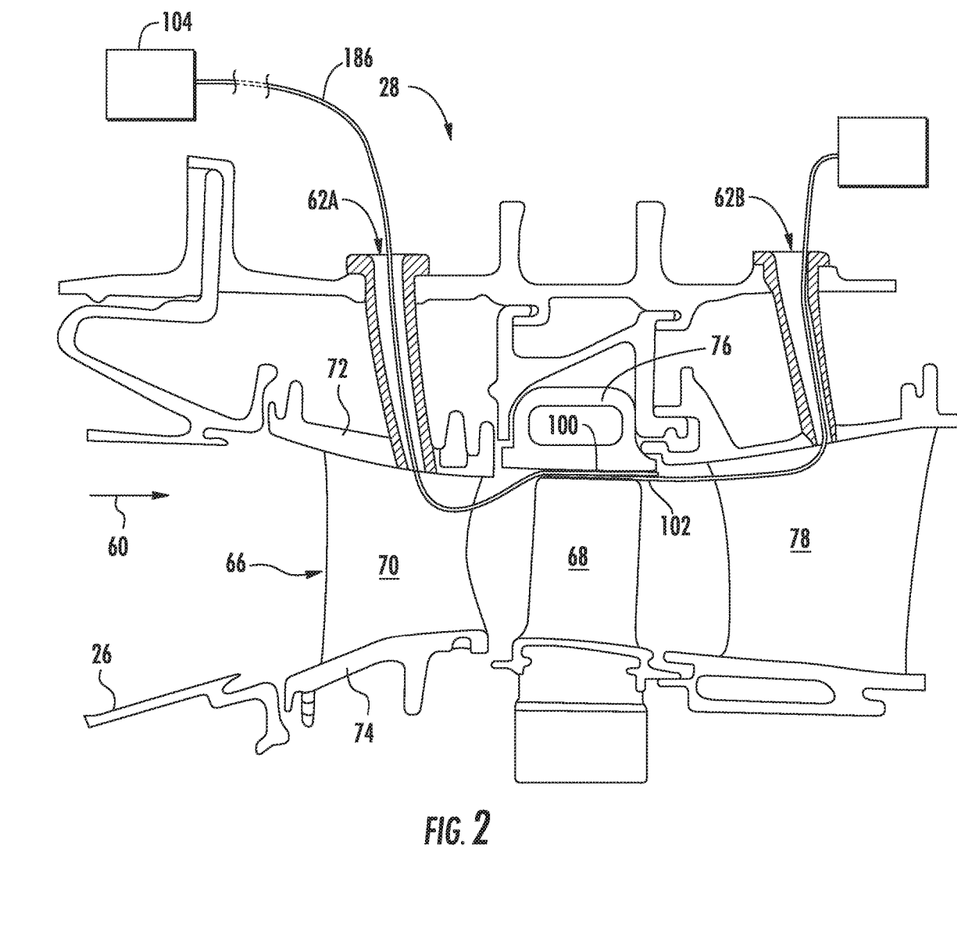
FIG. 2 illustrates a partial, cross-sectional view of one embodiment of a turbine suitable for use within the gas turbine engine shown in FIG. 1, particularly illustrating access ports defined in the engine for providing internal access to the turbine.

Referring now to FIG. 2, a partial, cross-sectional view of the first (or high pressure) turbine 28 described above with reference to FIG. 1 is illustrated in accordance with embodiments of the present subject matter. As shown, the first turbine 28 may include a first stage turbine nozzle 66 and an annular array of rotating turbine blades 68 (one of which is shown) located immediately downstream of the nozzle 66. The nozzle 66 may generally be defined by an annular flow channel that includes a plurality of radially-extending, circularly-spaced nozzle vanes 70 (one of which is shown). The vanes 70 may be supported between a number of arcuate outer bands 72 and arcuate inner bands 74. Additionally, the circumferentially spaced turbine blades 68 may generally be configured to extend radially outwardly from a rotor disk (not shown) that rotates about the centerline axis 12 (FIG. 1) of the engine 10. Moreover, a turbine shroud 76 may be positioned immediately adjacent to the radially outer tips of the turbine blades 68 so as to define the outer radial flowpath boundary for the combustion products 60 flowing through the turbine 28 along the hot gas path of the engine 10.

As indicated above, the turbine 28 may generally include any number of turbine stages, with each stage including an annular array of nozzle vanes and follow-up turbine blades 68. For example, as shown in FIG. 2, an annular array of nozzle vanes 78 of a second stage of the turbine 28 may be located immediately downstream of the turbine blades 68 of the first stage of the turbine 28.

Moreover, as shown in FIG. 2, a plurality of access ports 62 may be defined through the turbine casing and/or frame, with each access port 62 being configured to provide access to the interior of the turbine 28 at a different axial location. Specifically, as indicated above, the access ports 62 may, in several embodiments, be spaced apart axially such that each access port 62 is aligned with or otherwise provides interior access to a different stage of the turbine 28. For instance, as shown in FIG. 2, a first access port 62A may be defined through the turbine casing/frame to provide access to the first stage of the turbine 28 while a second access port 62B may be defined through the turbine casing/frame to provide access to the second stage of the turbine 28.

It should be appreciated that similar access ports 62 may also be provided for any other stages of the turbine 28 and/or for any turbine stages of the second (or low pressure) turbine 32. It should also be appreciated that, in addition to the axially spaced access ports 62 shown in FIG. 2, access ports 62 may be also provided at differing circumferentially spaced locations. For instance, in one embodiment, a plurality of circumferentially spaced access ports may be defined through the turbine casing/frame at each turbine stage to provide interior access to the turbine 28 at multiple circumferential locations around the turbine stage.

Figure 3:
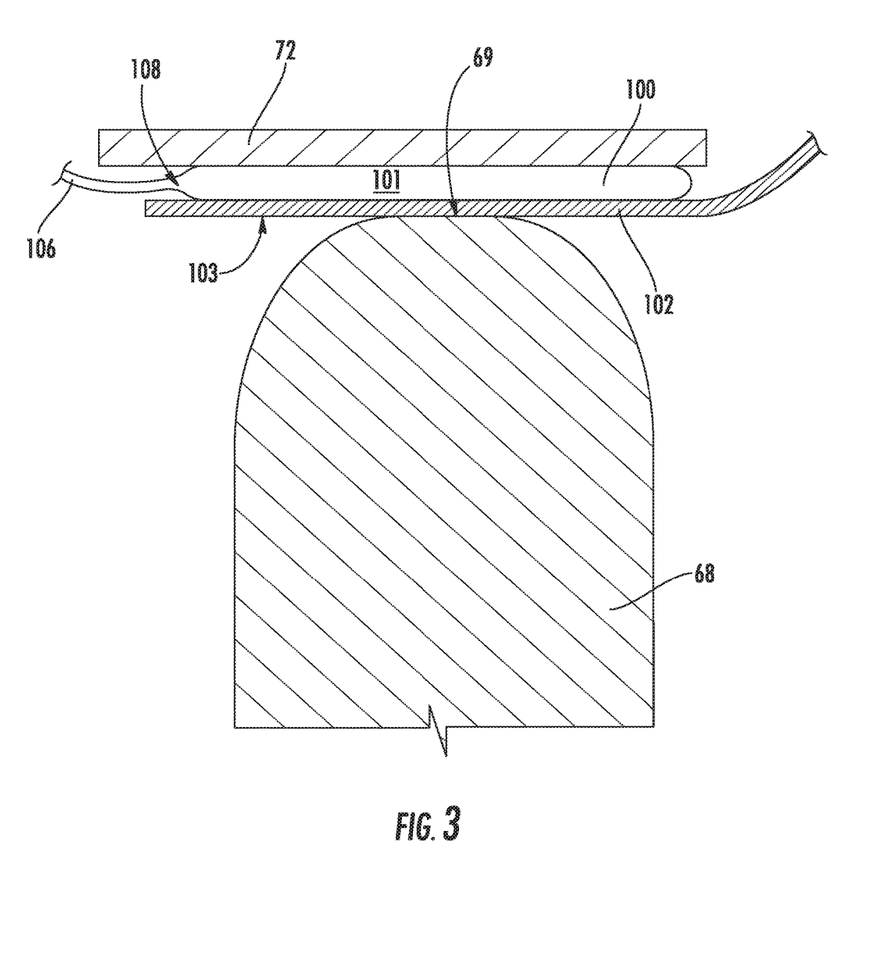
FIG. 3 illustrates a partial, cross-sectional view of one embodiment of a compressor suitable for use within the gas turbine engine shown in FIG. 1, particularly illustrating access ports defined in the engine for providing internal access to the compressor.
Figure 4:
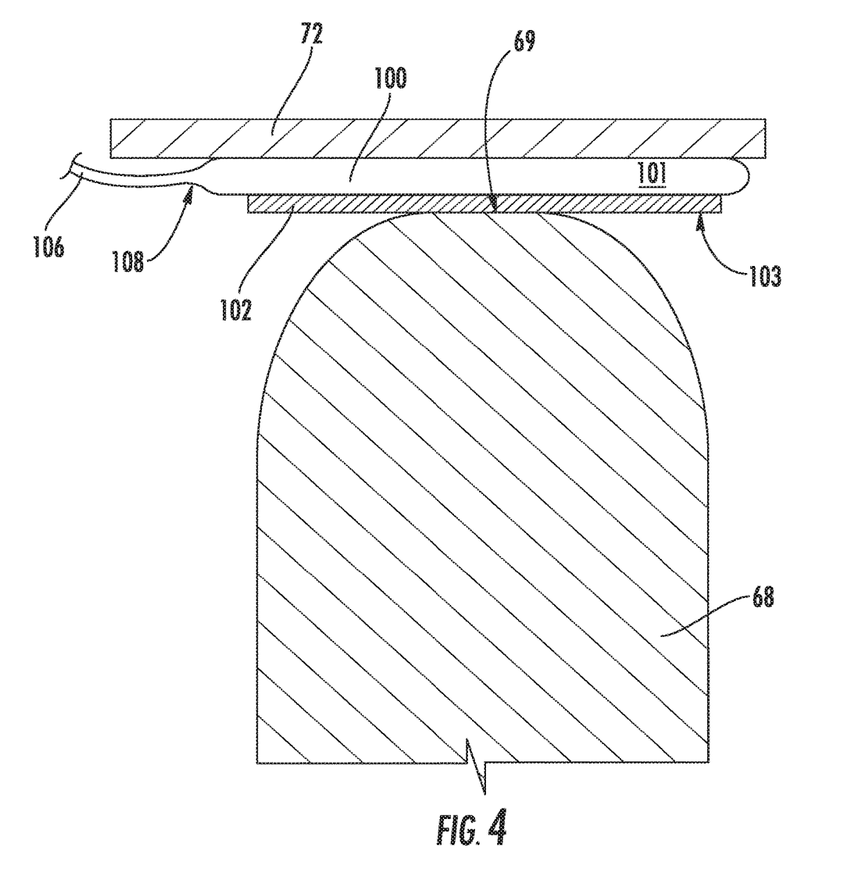
FIG. 4 illustrates a perspective view of an exemplary material supply in forced contact with a blade tip using an inflated bladder for use within the gas turbine engine shown in FIG. 1.

An inflatable bladder 100 and a material supply 102 are inserted and positioned between the tip 69 of the blade 68 and the inner surface 73 of the arcuate outer band 72 of the shroud 76, as shown in FIGS. 2, 3, and 4. In particular, the inflatable bladder 100 and a material supply 102 are positioned such that the material supply 102 is exposed to the tip 69 and the inflatable bladder 100 is positioned between the material supply 102 and the arcuate outer band 72 of the shroud 76. For example, the first bladder 100 may be installed by inserting the first bladder 100, in an uninflated state, through one of the access ports 62.

Figure 5:
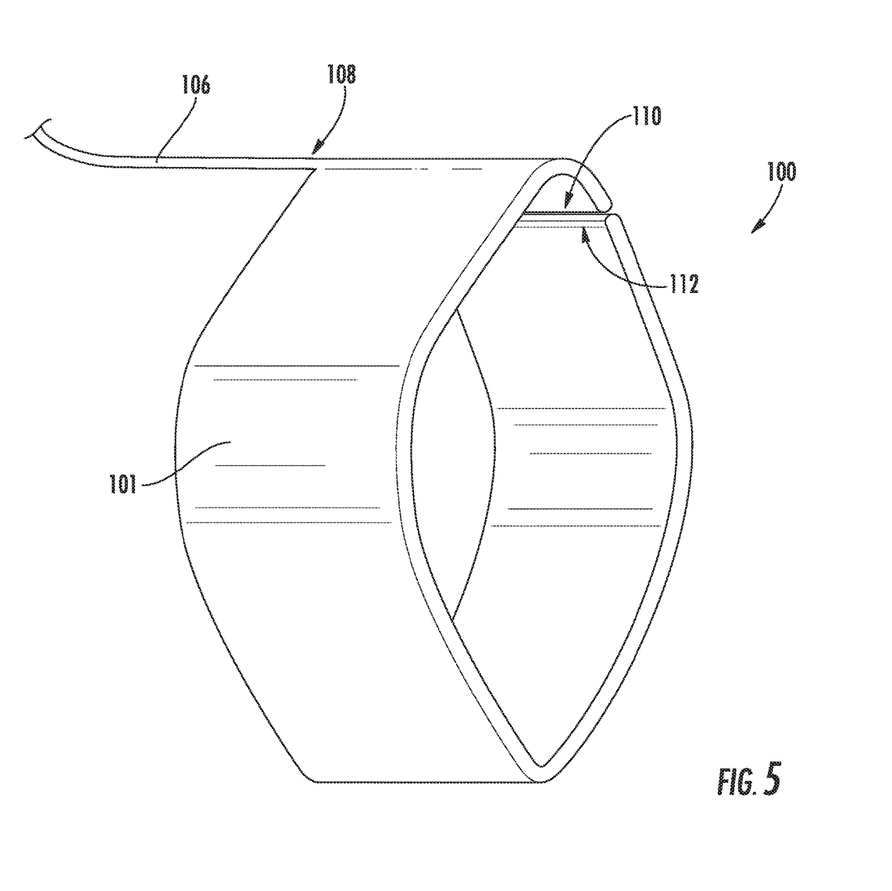
FIG. 5 illustrates an exemplary inflated bladder for use within the gas turbine engine shown in FIG. 1.

In the embodiment of FIG. 5 with respect to the inflatable bladder 100, the supply tube 106 is integral to the bladder body 101 so as to inflate the bladder body 101 between a first end 110 and a second end 112. Upon inflation, the bladder body 102 expands in its respective circumferential direction and in its respective longitudinal direction between the first end 110 and a second end 112. In the embodiment shown, the inlet 104 is positioned at the first end 110 of the bladder body 102. In this embodiment, the second end 112 can be inserted as desired within the engine, with the bladder body 102 trailing. For example, the second end 112 can be attached to a fiber optic cable delivery system (not shown) and positioned within the engine as desired. However, in other embodiments, the inlet 104 can be positioned in another position on the bladder body 102.

Thus, the inflated bladder body 102 fills the local space within the engine within which it is positioned. For example, the inflated bladder body 102 can extend between adjacent components within the engine (e.g., the arcuate outer band 72 of the shroud and an annular array of rotating blades 68).

In one embodiment, the material of the inflatable bladder 100 may be a fluid impermeable (e.g., a liquid impermeable material and/or a gas impermeable). In another embodiment, the material of the bladder 100 may be somewhat impermeable to the inflating fluid so as to allow for slow passing of the fluid through the bladders (e.g., at a flow through rate that is slower than the supply rate of the inflating fluid). The bladder 100 can be constructed of a deformable material, such as a plastic material (e.g., a plastic film, a plastic fibrous web, etc.), a rubber material, a paper material (e.g., a saturated paper material), or another material.

The inflatable bladder 100 can be inflated using an inflating fluid, such as a liquid, foam, a gas. The inflating bladder can be filled from a fluid source 104 (FIG. 2) through supply tube 106 and inlet 108 defined in the bladder body 101, as more particularly shown in FIG. 5. In particular embodiments, the inflatable bladder can be inflated using an inflating fluid, such as a liquid, foam, a gas. For example, in one embodiment, the inflating fluid can include water, an inert gas, a cleaning fluid, etc.

Once inflated, the inflatable bladder 100 may force contact between the material supply 102 and the tip 69 and the blade 68. As shown in the particular embodiment of FIG. 2, the bladder 100 is inserted in a first access port 62A, while the material supply 102 is inserted in a second access port 62B. However, in other embodiments, the bladder 100 and the material supply 102 may be inserted through the same access port 62.

Once in forced contact, relative movement can be caused between the material supply 102 and the tip 69 such that the relative movement in combination with the radial biased contact between the material supply 102 and the tip 69 creates heat through friction. This heat is sufficient to melt the surface 103 of the material supply 102 to transfer material from the material supply 102 to the tip 69. For example, the heat can soften, transfer, and weld new material from the material supply 102 onto the tip 69 of the blade 68.

In one embodiment, the relative movement is caused through rotating the engine such that the tip 69 of the blade 68 is rotating about the axis of the engine 10 (e.g., attached to a rotating disk). For example, the relative movement can be caused by the starter motor or an exterior motor (not shown) attached to the engine 10. The movement can be rotating movement of the blade about the axis (e.g., clockwise or counter-clockwise). Alternatively, the movement can be alternating movement of the blade about the axis clockwise for a relatively short distance (e.g., less than 30°) then counter-clockwise for a relatively short distance (e.g., less than 30°).

In one embodiment, the material supply is positioned along at least a segment of the shroud, and the engine rotation causes rotation of the disk such that the tip of each blade on the disk contacts the material supply. For example, the material supply can be positioned about a portion of the circumference of the arcuate outer band 72 of the shroud or about the entire arcuate outer band 72 of the shroud (e.g., forming a ring).

The pressure within the bladder 100 (i.e., the bladder pressure) can be monitored (such as at the fluid source 104 or the supply tube 106) so as to control the pressure between the material supply and the blade tip, which in turn controls the amount of frictional heat generated therebetween.

In an alternative embodiment, the movement can be made by moving the material supply axially back-and-forth.

Although shown with respect to a turbine section, the present disclosure can also be utilized with reference to the high pressure compressor 24 described above with reference to FIG. 1. For example, it should be appreciated that similar access ports 62 may also be provided for any of the other stages of the compressor 24 and/or for any of the stages of the low pressure compressor 22.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of material build-up on a tip of a blade of a gas turbine engine, the method comprising:
    inserting a material supply and an inflatable bladder between the tip and a shroud such that the material supply is exposed to the tip and the inflatable bladder is positioned between the material supply and the shroud;
    inflating the inflatable bladder to force contact between the material supply and the tip; and
    causing relative movement between the material supply and the tip, wherein the relative movement in combination with the radial biased contact between the material supply and the tip creates heat through friction.

2. The method of claim 1, wherein the relative movement frictionally welds new material from the material supply onto the tip of the blade.

3. The method of claim 1, wherein the heat created is sufficient to melt the surface of the material supply to transfer material from the material supply to the tip.

4. The method of claim 1, wherein the relative movement is caused through rotating the engine such that the tip of the blade is rotating about the axis of the engine.

5. The method of claim 4, wherein the material supply is positioned along at least a segment of the shroud, and wherein the blade is attached to a rotating disk having multiple blades extending therefrom.

6. The method of claim 5, wherein rotating the engine causes rotation of the disk such that the tip of each blade on the disk contacts the material supply.

7. The method of claim 6, wherein rotating the engine is accomplished by an external motor turning a shaft of the gas turbine engine.

8. The method of claim 4, wherein a plurality of material supplies are positioned along a respective segment of the shroud, and wherein the blade is attached to a rotating disk having multiple blades extending therefrom.

9. The method of claim 1, wherein inflating the bladder to force contact between the material supply and the tip comprises:
    supplying a fluid into the bladder.

10. The method of claim 9, wherein the fluid is supplied as a gas.

11. The method of claim 9, wherein the fluid is supplied as a liquid.

12. The method of claim 9, wherein the fluid is supplied as a foam.

13. The method of claim 9, further comprising:
    supplying the fluid to a bladder pressure within the bladder to create contact between the material supply and the tip of the blade.

14. The method of claim 13, further comprising:
    monitoring the bladder pressure to control the heat created through the relative movement between the material supply and the tip.

15. The method of claim 1, wherein the material supply is a material ring positioned between the shroud and tip, with the inflatable bladder being positioned between the material ring and the shroud.

16. The method of claim 15, wherein the relative movement is caused through moving the material supply axially back-and-forth.

17. A method of material build-up on a tip of a blade of a gas turbine engine, the method comprising:
    inserting a ring between the tip and a shroud, wherein the ring comprises a material;
    inserting an inflatable bladder between the ring and the shroud such that the ring is exposed to the tip and the inflatable bladder is positioned between the ring and the shroud;
    inflating the bladder to force contact between the ring and the tip; and
    causing relative movement between the ring and the tip, wherein the relative movement in combination with the radial biased contact between the ring and the tip creates heat through friction.

18. The method of claim 17, wherein inflating the bladder to force contact between the material supply and the tip comprises:
    supplying a fluid into the bladder.

19. The method of claim 17, wherein the relative movement is caused through rotating the engine such that the tip of the blade is rotating about the axis of the engine.

20. The method of claim 17, wherein the relative movement is caused through moving the material supply axially back-and-forth.

* * * * *